United States Patent [19]

Mao

[11] Patent Number: 5,689,594
[45] Date of Patent: Nov. 18, 1997

[54] MULTIPLE WAVELENGTH BIDIRECTIONAL LIGHTWAVE AMPLIFIER

[75] Inventor: Xiaoping Charles Mao, Plano, Tex.

[73] Assignee: MCI Communications Corp., Washington, D.C.

[21] Appl. No.: 769,201

[22] Filed: Dec. 18, 1996

Related U.S. Application Data

[63] Continuation of Ser. No. 581,746, Dec. 29, 1995.
[51] Int. Cl.$^6$ ..................................................... G02B 6/28
[52] U.S. Cl. ........................................... 385/24; 359/127
[58] Field of Search .................... 385/24, 27, 16, 385/4; 359/127, 130, 110, 152, 124, 118, 165

[56] References Cited

U.S. PATENT DOCUMENTS

| | | | |
|---|---|---|---|
| 5,396,357 | 3/1995 | Goossen et al. | 359/119 |
| 5,440,416 | 8/1995 | Cohen et al. | 359/127 |
| 5,544,268 | 8/1996 | Bischel et al. | 385/16 |
| 5,600,466 | 2/1997 | Tsushima et al. | 359/124 |

FOREIGN PATENT DOCUMENTS

| | | |
|---|---|---|
| 0 543 570 A2 | 5/1993 | European Pat. Off. . |
| 0 724 314 A1 | 7/1996 | European Pat. Off. . |
| WO 95/24065 | 9/1995 | WIPO . |

OTHER PUBLICATIONS

Optical Fiber Communication. Summaries of papers presented at the conference OFC '95, San Diego, Feb. 26 –Mar. 3, 1995, vol. 8, 26 Feb. 1995, Institute of Electrical and Electronics Engineers, pp. 272 –273, XP000517704, Chawki, M.J. et al.:"Wavelength Reuse in a WDM Unidirectional Ring Network by Using a Fiber–Grating Add/Drop Multiplexer".

Proceedings of the Optical fiber Communication Conference, San Jose, Feb. 2 –7, 1992, no Conf. 15, 2 Feb. 1992, Institute of Electrical and Electronics Engineers, pp. 203–204, XP000341678 SU S.F. et al.: "Use of Acoustooptic Tunable Filters as Equalizers in WDM Lightwave systems".

Electronics Letters, vol. 29, No. 14, 8 Jul. 1993, pp. 1268–1270, XP000322267, Seikai S. et al.: "Novel Optical circuit Suitable for Wavelength Division Bidirectional Optical Amplification".

Electronics Leters, vol. 31, No. 20, 28 Sep. 1995, pp. 1757–1759, XP000538092, Fukui M. et al.: "10 Channel x 10 Gbit/s WDM add/drop multiplexing/transmission experiment of 240 km of dispersion–shifted fibre employing unequally–spaced arrayed–waveguide–grating ADM filter with fold–back configuration".

*Primary Examiner*—Akm E. Ullah

[57] ABSTRACT

A system and method for optimizing the performance, in a multichannel optical transmission system, of an optical signal regenerator, by compensating for input signal power fluctuation and for output signal gain change, and by mildly filtering individual wavelengths between gain block stages. A system and method to provide amplification and refinement of a bidirectional optical signal in a single amplification and refinement stage.

20 Claims, 5 Drawing Sheets

MULTIPLE WAVELENGTH BIDIRECTIONAL LIGHTWAVE AMPLIFIER

This application is a continuation of application Ser. No. 08/581,746, filed Dec. 29, 1995.

BACKGROUND OF THE INVENTION

1. Field of the Invention

The present invention relates to an optical transmission system. In particular, the present invention pertains to a multiple wavelength bidirectional lightwave amplifier.

2. Related Art

An optical transmission system transmits information from one place to another by way of a carrier whose frequency is in the visible or near-infrared region of the electromagnetic spectrum. A carrier with such a high frequency is sometimes referred to as an optical signal, an optical carrier, or a lightwave signal.

An optical transmission system includes a plurality of optical fibers. Each optical fiber includes a plurality of channels. A channel is a specified frequency band of an electromagnetic signal, and is sometimes referred to as a wavelength. One link of an optical transmission system typically has a transmitter, the optical fiber, and a receiver. The transmitter converts an electrical signal into the optical signal and launches it into the optical fiber. The optical fiber transports the optical signal to the receiver. The receiver converts the optical signal back into an electrical signal.

An optical transmission system that transmits more than one channel over the same optical fiber is sometimes referred to as a multichannel system. The purpose for using multiple channels in the same optical fiber is to take advantage of the unprecedented capacity offered by optical fibers. Essentially, each channel has its own wavelength, and all wavelengths are separated enough to prevent overlap.

One way to transmit multiple channels is through wavelength division multiplexing, whereupon several wavelengths are transmitted in the same optical fiber. Typically, four channels are interleaved by a multiplexer, launched into the optical fiber, and separated by a demultiplexer at a receiver. Wavelength division demultiplexing elements separate the individual wavelengths using frequency-selective components such as optical gratings or bandpass filters.

Optical signals traveling over long distances need to be regenerated periodically to compensate for fiber loss, sometimes referred to as signal attenuation. Fiber loss reduces the average signal power reaching the receiver. Because optical receivers need a certain amount of power in order to recover the optical signal accurately, the transmission distance of the optical signal is limited by fiber loss.

Optical signal regeneration sometimes utilizes optoelectronic regenerators. A typical optoelectronic regenerator employs a receiver-transmitter pair that detects the incoming optical signal, converts it into an electrical signal, amplifies and refines the electrical signal, and then converts the amplified electrical signal back into a corresponding optical signal. However, optoelectronic regenerators are quite complex and expensive for multichannel systems. Additionally, the electronic components in optoelectronic regenerators cause transmission system bandwidth to be limited. In other words, the difference between the lowest wavelength transmitted and the highest wavelength transmitted is very narrow. Multichannel lightwave systems benefit considerably when optoelectronic regenerators are replaced by much simpler optical amplifiers because the bandwidth of optical amplifiers is much larger than that of optoelectronic regenerators. Loss compensation is carded out in an optical amplifier by amplifying the optical signal directly, without converting it to an electrical signal. In either case, regeneration boosts the signal level and corrects for transmission impairments.

One characteristic of multichannel optical transmission system concerns the bidirectional application of the optical fiber. In some systems, one set of channels travels in an east-to-west direction in the optical fiber, while another set of channels travel in a west-to-east direction. In order to compensate for signal attenuation, conventional regenerators must utilize two separate gain blocks, one for the incoming east-to-west set of channels and another for the incoming west-to-east set of channels.

Another characteristic of a multichannel optical transmission system is that noise is generated at different points along the length of the system. More particularly, the gain block of the optical amplifier signal regenerator adds noise to the optical signal because of spontaneous emission during amplification. As more noise is added to the optical signal, coupled with the fact that the optical amplifier amplifies the weakest channel the least, the signal-to-noise ratio of the weaker channels becomes degraded. Signal-to-noise ratio is the ratio of the amplitude of the channel to that of the noise. Signal-to-noise ratio is quantified through a parameter called noise figure. Noise figure ($F_n$) is defined as $$F_n = \frac{(SNR)_{in}}{(SNR)_{out}}$$

where SNR refers to the power contained in the channel.

Still another characteristic of conventional multichannel optical transmission systems is that each of the incoming channels may arrive at the signal regenerator input with a different amplitude. This occurs because of fiber attenuation, fiber dispersion, and non-uniform regenerator spacing.

Fiber attenuation is a decrease in average optical power, and results from loss due to scatter, loss due to imperfections in the fiber, and loss due to absorption. Rayleigh scatter occurs when a portion of the lightwave bounces off the uneven areas of the fiber surface, losing energy in the process. Fiber imperfections can stem from the fact that the particular fiber was manufactured using older technology and from the fact that the fiber has bends, either large or small.

Loss due to absorption can be either intrinsic or due to impurities. Intrinsic loss is a basic property of optical fiber whereby because electromagnetic phenomena the energy in the optical signal is absorbed and not recoverable at the receiver. Impurity loss occurs primarily because the presence of water vapors and other impurities cause optical signal energy absorption similar to loss due to intrinsic absorption.

Equally important is the fact that fiber attenuation due to absorption is different at different wavelengths. Two wavelengths that have minimal attenuation are 1300 nm and 1550 nm. The typical attenuation of an optical signal operating 1300 nm, 35 dB/100 km, is much greater than the attenuation of an optical signal operating at 1550 nm, which is 20 dB/100 km. Furthermore, within what is called the 1550 nm transmission window, then the attenuation will be the least at 1550 nm and increase as the operating wavelength moves away from 1550 nm. The same holds true for operating in the 1300 nm transmission window. Unfortunately, it is not feasible to operate at only the wavelength that ensures the least attenuation because that would defeat the objective of having a wide bandwidth of operating wavelengths.

Fiber loss is only one cause for differing input amplitudes. Dispersion in the optical fiber also causes channel amplitudes to vary. The optical fiber is a very thin wire made of glass, or silica, enclosed by cladding. The cladding is designed to reflect the lightwaves into the core of the silica wire. At times, lightwaves reflect back and forth between the core and the cladding so much that the reflected lightwaves are delayed and arrive at the transmission system receiver after the primary lightwave arrives. The delayed lightwaves can be troublesome depending on the type of optical fiber used. Multimode dispersion occurs in what are termed multimode fibers. Single mode fibers eliminate the effects of multimode dispersion, but introduce chromatic dispersion when operating within the 1550 nm transmission window. Step-index fibers have minimal chromatic dispersion operating at 1300 nm, but significant chromatic dispersion at 1550 nm. Dispersion-shifted fibers experience minimum chromatic dispersion operating within the 1550 nm transmission window. As a practical matter, there is no guarantee what type of optical fiber will be utilized for each link of an optical transmission system that spans an entire continent.

Another cause for differing input amplitudes stems from non-uniform regenerator spacing. For example, one channel may originate in Seattle, and another channel in New York. The ultimate destination of each channel is Washington, D.C. In that case, the channel originating in Seattle travels further than the channel originating in New York. Because signal regenerators are placed at convenient as opposed to uniform locations along the route from origin to destination, it is difficult to ensure that the two optical channels arrive at their common destination with the same signal amplitude. A typical gain block of an optical amplifier signal regenerator receives the composite unidirectional signal and amplifies the channel with the greatest incoming amplitude, to the detriment of the weaker channels.

One problem with conventional multichannel optical transmission systems is that the difference in amplification between any two channels must be tolerable. It is desirable to have equal amplitudes for each wavelength. Moreover, the signal-to-noise ratio in any given channel must also be within acceptable limits. This condition is not met when utilizing conventional signal regenerators because of unequal channel amplitude, unequal channel amplification, and the addition of noise in each channel.

Another problem with conventional signal regenerators is that the design is quite complex, expensive, and has poor upgrade capability. For example, in order to operate at higher data rates without changing regenerator spacing, a designer would have to replace most of the system equipment. This is because the electronic elements are normally tuned to the operating parameters of a particular system. If it becomes necessary to increase system capacity, the electronic elements must be replaced. If the gain block section of the signal regenerator is optoelectronic, then the entire regenerator must be replaced. Likewise, it is expensive to have two amplification and refinement stages to service bidirectional optical signals.

SUMMARY OF THE INVENTION

The present invention is a system and method for optimizing the performance, in a multichannel optical transmission system, of an optical signal regenerator by compensating for input signal power fluctuation and for output signal gain change, and by mildly filtering individual wavelengths between gain block stages. The system includes two wavelength division multiplexers coupled to an optical fiber, four power management units coupled to the wavelength division multiplexers, a wavelength combiner coupled to the power management units, two optical amplifiers with a power equalizer conditioner in between them, and a wavelength splitter coupled to one of the optical amplifiers and to the wavelength division multiplexers. The method includes the steps of amplifying and refining bidirectional optical signals using only a single unidirectional amplification and refinement stage. Amplification of bidirectional signals is accomplished using a plurality of gain blocks. Refinement of bidirectional signals is accomplished by controlling the amplitudes of a plurality of wavelengths.

DETAILED DESCRIPTION OF THE PREFERRED EMBODIMENTS

Figure 1:
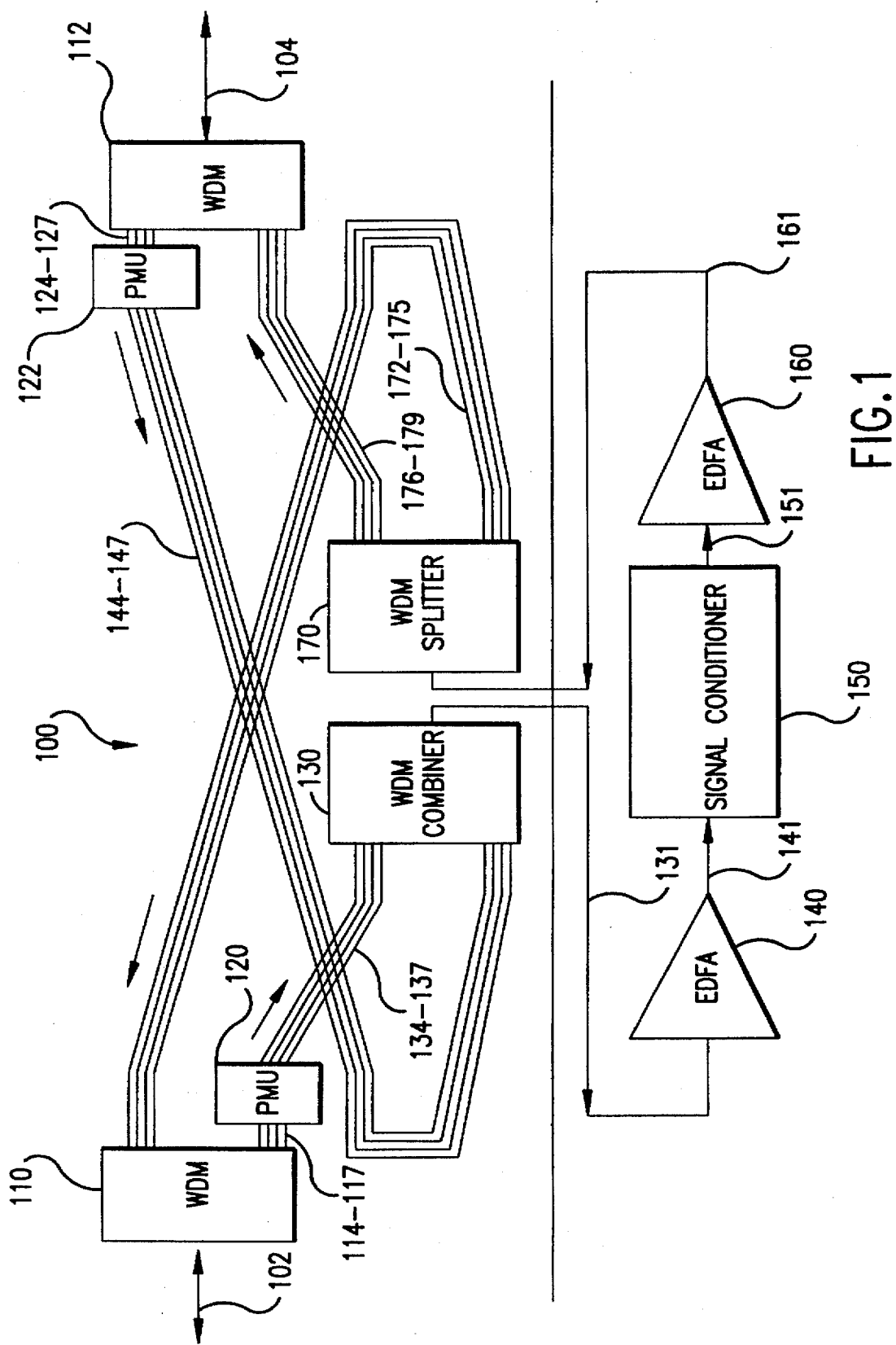
FIG. 1 illustrates the power fluctuation compensation of the present invention.

FIG. 1 illustrates a multiple wavelength bidirectional lightwave amplifier 100 (hereinafter amplifier 100) that monitors incoming wavelengths (or channels), as well as their individual power levels, and controls the input wavelength amplitudes. The present invention ensures equal outputs of the individual wavelength by compensating for input power fluctuations, thereby effectively improving the dynamic range of amplifier 100. Amplifier 100 accomplishes the above by equalizing the power among the different wavelengths. An eight channel amplifier 100 is depicted in FIG. 1 for illustrative purpose. However, the present invention contemplates any number of channels (or wavelengths).

Amplifier 100 provides amplification and refinement in a single stage. In amplifying and refining a bidirectional optical signal, the present invention eliminates the need for two stages, one for incoming signals traveling in an east-to-west direction and a second stage for incoming signals traveling in the west-to-east direction. Both sets of incoming signals utilize the same refinement and amplification stage.

Amplifier 100 monitors the relative amplitudes of the incoming channels and controls the individual channels in order to compensate for any power fluctuations. Optical fibers 102 and 104 are coupled to wavelength division multiplexing elements 110 and 112, respectively, which provide the input ports and output ports of amplifier 100. Wavelength division multiplexing elements 110 and 112 are coupled to the inputs of power management units 120 and 122, respectively. The outputs of power management units 120 and 122 are coupled to the input of an optical combiner 130. The output of optical combiner 130 is coupled to the input of erbium doped fiber amplifier (or gain block) 140. The output of gain block 140 is coupled to the input of a signal conditioner 150. The output of signal conditioner 150 is coupled to the input of erbium doped fiber amplifier optical amplifier (or gain block) 160. The output of gain block 160 is coupled to the input of an optical splitter 170. The outputs of optical splitter 170 are coupled to the inputs of wavelength division multiplexing elements 110 and 112.

Optical fibers 102 and 104 form part of a multichannel optical network (or system) whereupon optical signals are passed in two different directions. Optical fibers 102 and 104 in their simplest form consist of a cylindrical core of silica glass surrounded by cladding whose refractive index is lower than that of the core. In practice, when compared to electronic transmission media, the bandwidth of optical fibers 102 and 104 is considerable. The potential bandwidth of optical fibers 102 and 104 is approximately 20 THz, which is enough for 312 million telephone quality voice channels per fiber.

Each optical fiber carries four channels that travel into (in the east-to-west direction) amplifier 100 and four channels that travel into (in the west-to-east direction) amplifier 100. East-to-west channels are completely different from west-to-east channels. East-to-west channels enter at wavelength division multiplexing element 110 and west-to-east channels enter at wavelength division multiplexing element 112.

Both wavelength division multiplexing elements 110 and 112 are similar and, in a preferred embodiment, use a frequency selection component such as a diffraction grating. A diffraction grating angularly disperses light into various components as a function of wavelength. Wavelength division multiplexing elements 110 and 112 establish spatially independent optical channels by separating the wavelengths out of optical fibers 102 and 104, respectively. Wavelength division multiplexing elements 110 and 112 are purely passive and reversible so either may perform wavelength combining or wavelength splitting functions. Other than some optical signal loss because of imperfect coupling and some crosstalk from imperfect channel separation, the multiplex/demultiplex operations are transparent to the individual channel wavelengths. A feature of wavelength division multiplexing elements 110 and 112 is that they are also transparent to the bidirectional nature of optical signals 102 and 104. Separated wavelengths 114–117 and 124–127 are passed on to power management units 120 and 122, respectively.

Power management unit 120 monitors and controls the relative amplitudes of incoming wavelengths 114–117. The monitoring function provides a benchmark of the amplitudes for future application. The control function adjusts the amplitude of wavelengths 114–117 as needed to bring them within tolerable differential levels depending on system parameters. Power management unit 120 can be an acoustic optical tunable filter or a variable optical attenuator, for example. Power management unit 122 performs in a similar manner as power management unit 120, but on wavelengths 124–127.

With power management units 120 and 122 located between wavelength division multiplexing elements 110 and 112, respectively, and optical combiner 130, amplifier 100 ensures equal input amplitudes on a per wavelength basis. This design automatically compensates for any power fluctuation of the optical signal inputs. Power management units 120 and 122 overcome the disadvantages associated with conventional multichannel lightwave systems. That is, power management traits 120 and 122 compensate for the fact that wavelength or channels within optical signals 102 and 104 arrive at a common destination with different amplitudes.

Optical combiner 130 receives amplitude adjusted wavelengths 134–137 and 144–147 and combines them to produce a composite signal 131. Composite signal 131 contains all eight wavelengths, and is produced by well known optical combining techniques, such as by using a fused filter coupler or a wavelength division multiplexing element. Composite signal 131 is coupled to the input of gain block 140.

Gain block 140 is an optical amplifier. Gain block 140 receives and amplifies all eight wavelengths representing both propagation directions in the original optical fibers 102 and 104. In a preferred embodiment, gain block 140 is an erbium doped fiber amplifier. However, gain block 140 may be any amplifier responsive to composite signal 131 and compatible with amplifier 100 design parameters. Gain block 140 directly amplifies each wavelength, without the need for optical to electrical conversion. It provides the amplification necessary to overcome fiber loss or fiber attenuation. Gain block 140 provides high gain over extremely wide bandwidths. The wider bandwidth matches reasonably well the bandwidth available from optical fibers 102 and 104 as discussed above. Moreover, gain block 140 can tolerate optical signals of any format (or modulation scheme, such as polarity shift keying or amplitude shift keying) or bit rate, which is termed transparency.

Transparency is advantageous because it provides flexibility for a system operator. In principle, the system operator can provide a variety of communications services at different bit rates over the same system, without the need for changing gain blocks as required with conventional optoelectronic regenerators. The output of gain block 140 is an amplified, unidirectional composite signal 141 with eight wavelengths and feeds into a gain block 160 (configuration not shown), but more preferably, into signal conditioner 150. Signal conditioner 150 is well known in the art, and can be implemented using a dispersion compensator or wavelength add/drop element.

When no signal conditioning is desired, gain block 160 receives signal 151 directly from gain block 140. Gain block 160 is similar to gain block 140 and performs the same function of amplifying all eight wavelengths representing both propagation directions in the original optical fibers 102 and 104. In this manner, gain block 160 amplifies signal 151 without regard for the quality of signal 151 (other than signal amplitude). The output of gain block 160 is amplified unidirectional signal 161 and is a composite of the eight wavelengths of original optical fibers 102 and 104. Signal 161 feeds into wavelength splitter 170.

Wavelength splitter 170 receives and separates composite unidirectional signal 161 into component wavelengths in a fashion similar to wavelength division multiplexing elements 110 and 112. In particular, wavelength splitter 170 presents to wavelength division multiplexing element 110 the same four wavelengths 172–175 that were received along optical fiber 102 and separated as 114–117. Likewise, wavelength splitter 170 presents to wavelength division multiplexing element 112 the same four wavelengths 176–179 that were received along optical fiber 104 and separated as 124–127. In other words, wavelengths 172–175 are the same wavelengths as 114–117, and wavelengths 176–179 are the same wavelengths as 124–127. However, the amplitudes are different because they have been adjusted to compensate for power fluctuations at amplifier 100 input. Wavelengths 172–175 and 176–179 travel out of wavelength division multiplexing elements 110 and 112, respectively, and are launched into optical fibers 102 and 104, respectively.

In this embodiment of the present invention amplifier 100 allows for optimized operation of equal amplitudes of each wavelength by measuring the input signal power per wavelength. The present invention then controls input wavelength amplitudes by equalizing power among the different wavelengths. By compensating for power fluctuation, the present invention thus improves the effective dynamic range of amplifier 100.

There are strategic advantages concerning placement of power management units 120 and 122. Placing power management units 120 and 122 on the inputs of optical combiner 130 compensates for unequal power distribution among the incoming wavelengths. Thus, total power is enhanced in this embodiment of the present invention. Given that gain blocks 140 and 160 introduce noise into the individual wavelengths, however, the noise figure of amplifier 100 is jeopardized. Nonetheless, if enhanced optical signal power is of paramount importance, then the embodiment depicted in FIG. 1 is appropriate.

In an alternate embodiment, the present invention measures signal-to-noise ratio of each wavelength and controls output wavelength amplitudes. Again, the amplifier accomplishes this by equalizing power among the different wavelengths.

Figure 2:
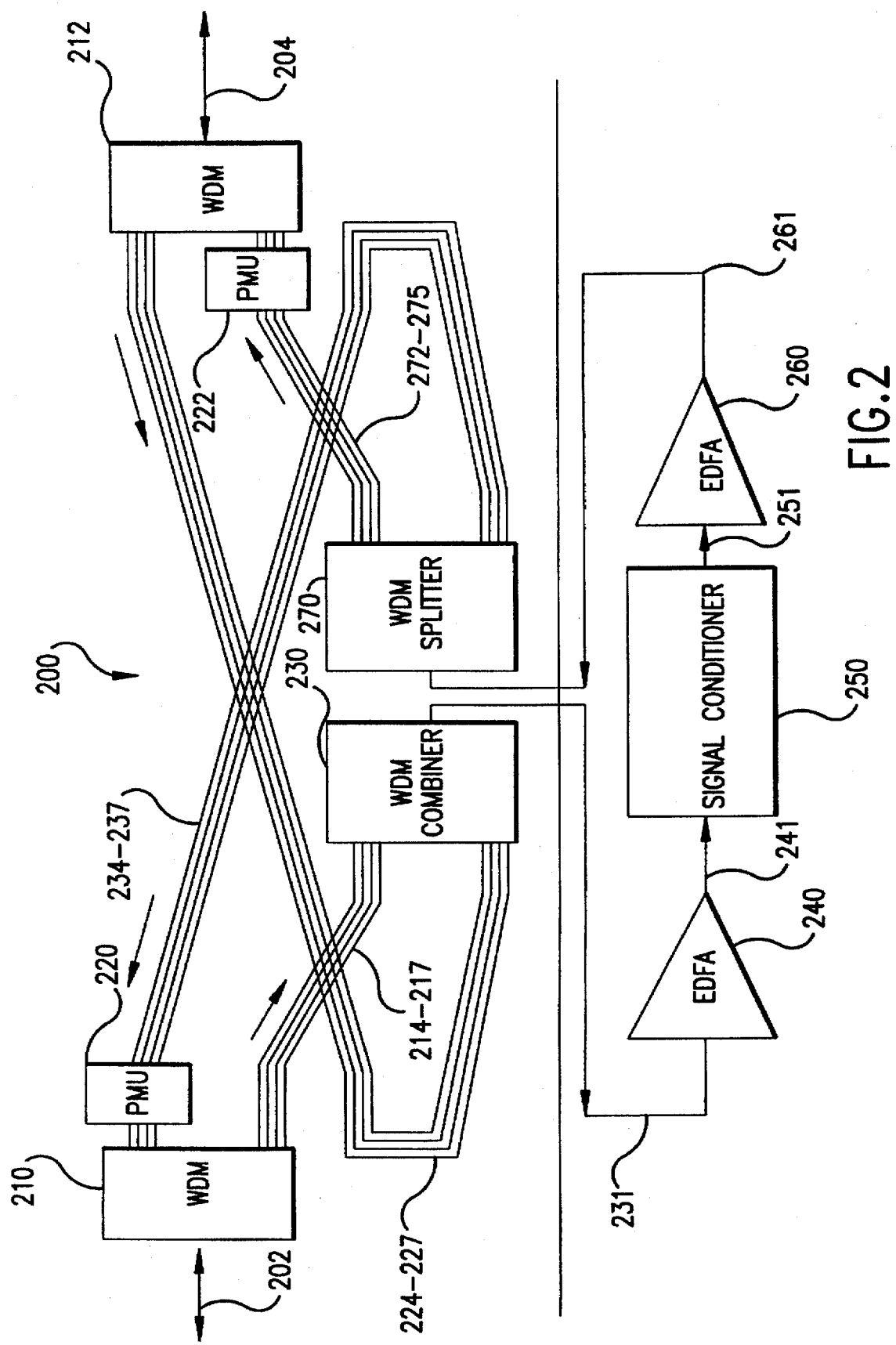
FIG. 2 illustrates the gain change compensation of the present invention.

FIG. 2 illustrates an alternate embodiment of the present invention. FIG. 2 shows eight wavelength multiple wavelength bidirectional lightwave amplifier 200. Similarly to amplifier 100, any number of wavelengths may be serviced. Amplifier 200 optimizes the signal-to-noise ratio of each wavelength by automatically compensating for any gain change in the wavelengths. Optical fibers 202 and 204 are coupled to wavelength division multiplexing elements 210 and 212 respectively, which provides the input and output ports of amplifier 200. Wavelength division multiplexing elements 210 and 212 are similar to wavelength division multiplexing elements 110 and 112. The outputs of wavelength division multiplexing elements 210 and 212 are coupled to the inputs of optical combiner 230. The output of optical combiner 230 is coupled to a gain block 240, whose output is coupled to the input of a signal conditioner 250 or, alternatively to a gain block 260. The input of an optical splitter 270 is coupled to the output of either signal conditioner 250 or gain block 240. The outputs of optical splitter 270 are coupled to power management traits 220 and 222. Power management units 220 and 222 can be acoustic optical tunable filters or variable optical attenuators. Power management unit 220 and 222 outputs are coupled to wavelength division multiplexing elements 210 and 212 respectively.

As mentioned above, there are strategic advantages concerning placement of power management units. Placing power management units 220 and 222 on the outputs of optical splitter 270 compensates for the noise degradation introduced by gain blocks 240 and 260. However, total power is sacrificed in this embodiment of the present invention. This is because the majority of the amplification power gets invested in the wavelength with the greatest amplitude, to the detriment of the weaker wavelengths. Nonetheless, if noise figure is of a greater concern than power, the embodiment depicted in FIG. 2 is appropriate.

Figure 3:
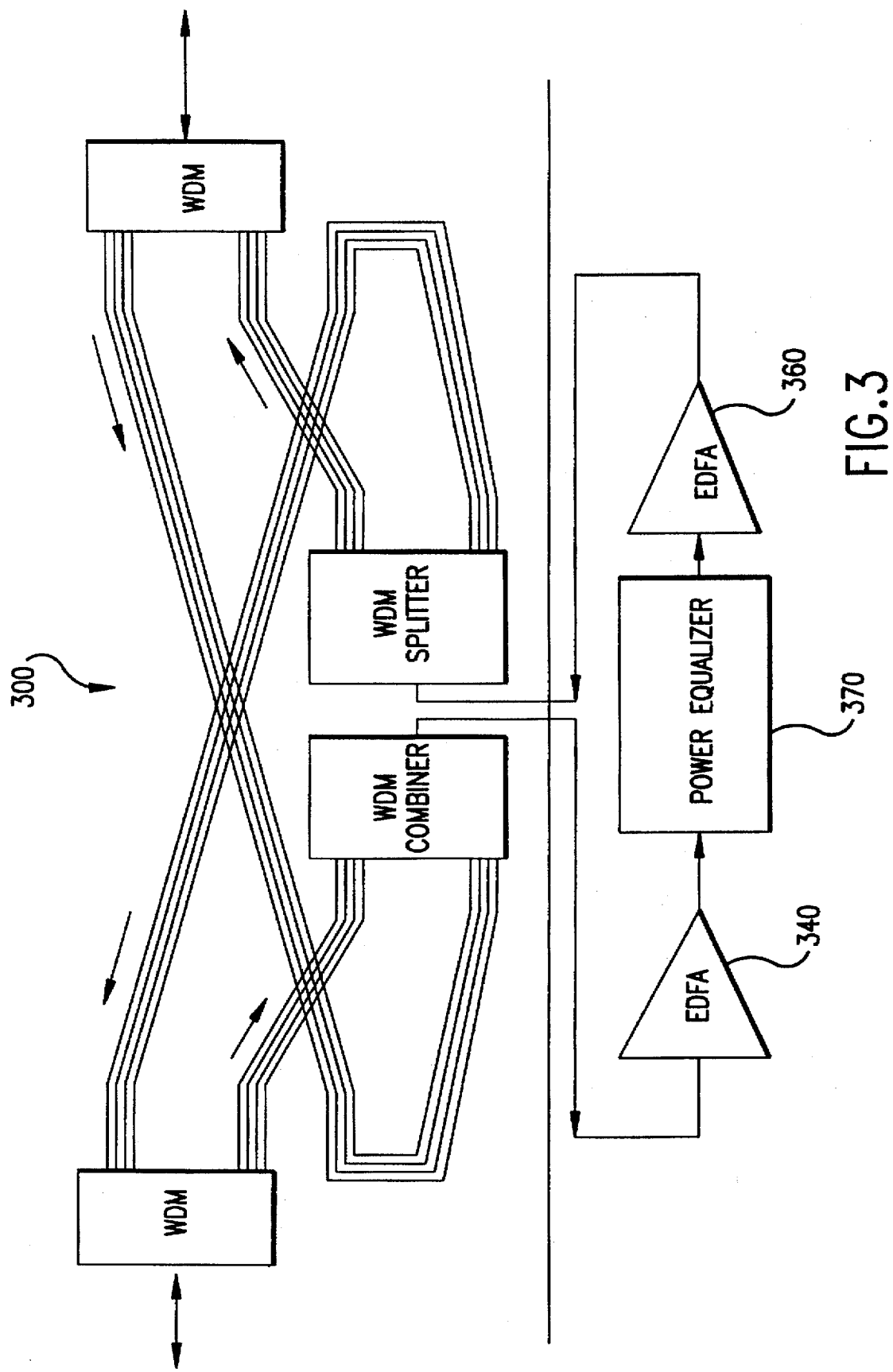
FIG. 3 illustrates the mild filtering of the present invention.

FIG. 3 illustrates another embodiment of the present invention. Power equalizer 370 performs mild filtering of selected wavelengths so as to optimize the relative gain applied to the different wavelengths prior to retransmission into the fiber. Power equalizer 370 may, for example, take the form of an acoustic optical tunable filter in which the characteristics may be dynamically adjusted by external electrical signals, or a variable attenuator. The strategic advantage of placing power equalizer 370 between gain block 340 and 360 is that power equalizer 370 compensates for unequal power distribution among the incoming wavelengths, on the one hand, and compensates for the noise degradation introduced by gain block 340, on the other hand. In other words, in the embodiment represented by FIG. 3, total power sacrificed is less than that sacrificed by implementing the embodiment represented by FIG. 1. Likewise, amplifier noise figure is better than the amplifier noise figure of the embodiment represented by FIG. 2.

Figure 4:
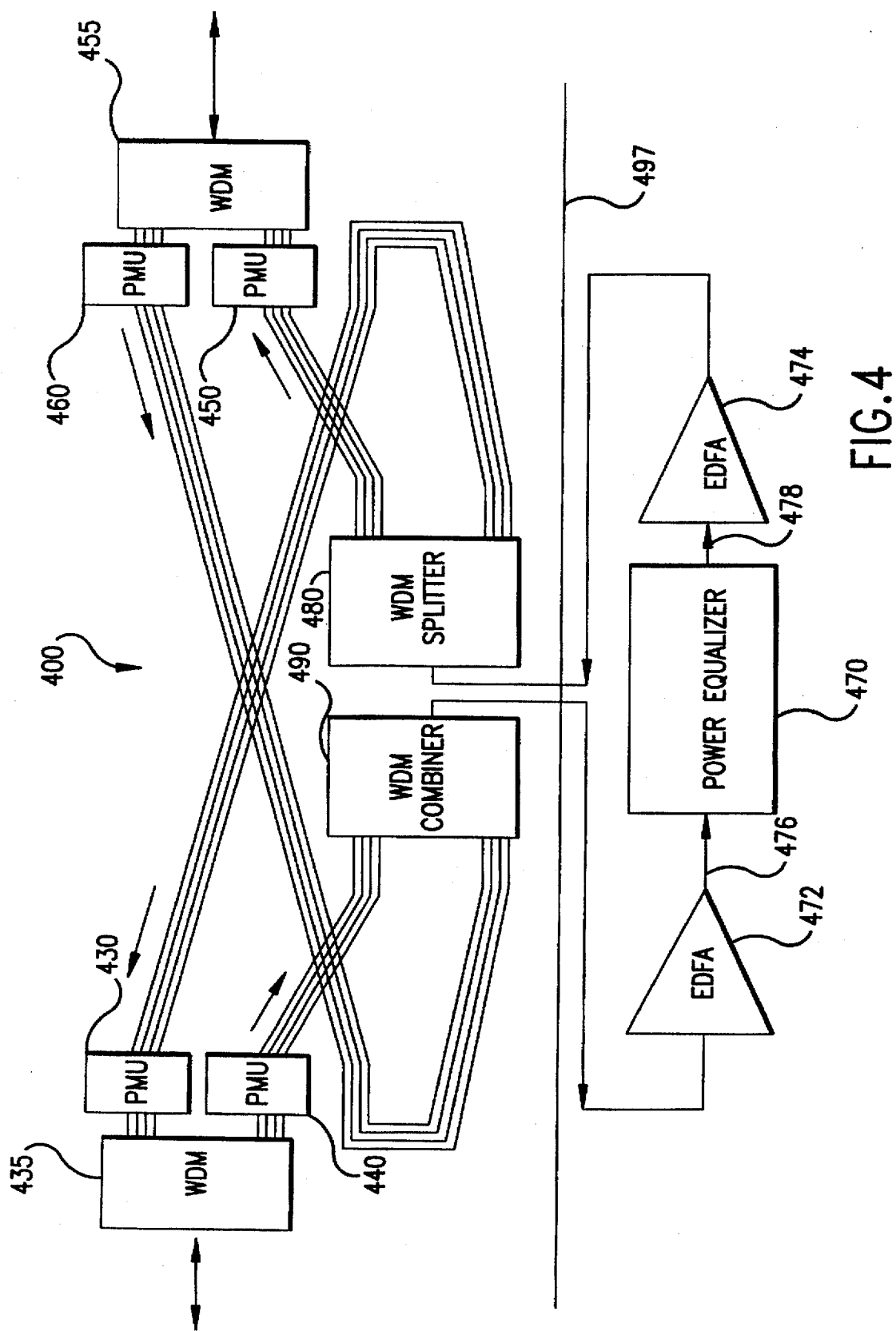
FIG. 4 illustrates a preferred embodiment of the present invention.

FIG. 4 depicts a multiple wavelength bidirectional lightwave amplifier 400 that is a combination of amplifiers shown in FIG. 1 and FIG. 2, and power equalizer 370 of FIG. 3. In a preferred embodiment, amplifier 400 amplifies and refines bidirectional optical signals using only a single amplification and refinement stage. In amplifying and refining a bidirectional optical signal, the present invention eliminates the need for two stages, one for incoming signals traveling in an east-to-west direction and a second stage for incoming signals traveling in the west-to-east direction, Both sets of incoming signals utilize the same refinement and amplification stage.

Power management unit 440 monitors the relative amplitude of the four separate wavelengths incoming along one direction. Power management unit 430 monitors the amplitudes of the same four signals after undergoing amplification or other refinements sited above. Power equalizer 470 performs mild filtering between gain blocks 472 and 474.

Power management units 440 and 430 may be used as sensors in conjunction with power equalizer 470 as an actuator to form a feedback loop. This feedback loop may take the form of a simple circuit or a more sophisticated control processor (not shown) that automatically and adaptively adjusts the gain characteristics to flatten frequency response.

Otherwise, a controller (not shown) might optimize the gain for each wavelength, for example, to improve signal-to-noise ratios. A further use of such a controller might be to squelch unused wavelengths and avoid idle or failed channels degrading signals of other wavelengths.

Power management units 430, 440, 450, and 460, and power equalizer 470 are also utilized for monitoring and tuning system performance from a remote network control center. Power management units 450 and 460 serve a similar purpose to power management units 430 and 440, but apply to signals propagating in the opposite direction. Power management traits 430, 440, 450 and 460, and power equalizer 470 can be acoustic optical tunable filters or variable attenuators.

A horizontal line 497 divides FIG. 4 into upper and lower portions. The upper portion is considered to be the principally bidirectional portion whereas the lower portion is solely unidirectional in terms of signal flow. The upper portion is also the modular portion consisting of relatively inexpensive components that may be interchanged as needed to accommodate differing numbers of wavelengths traveling through the optical fibers. In contrast, the lower portion includes the expensive optical amplifiers and other elements that need not to be changed to alter the use of the optical fibers.

Figure 5:
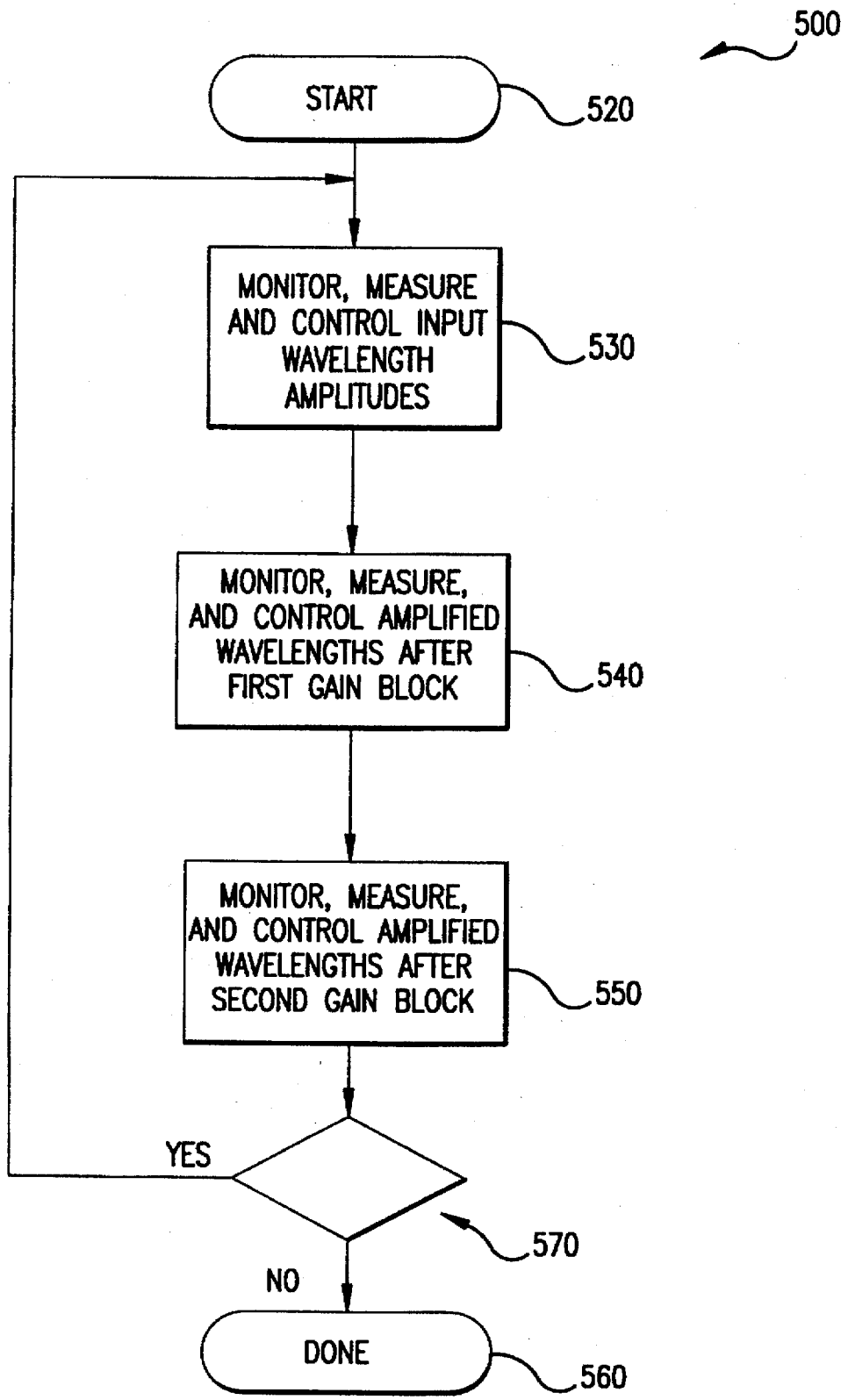
FIG. 5 is a flowchart depicting the operation of the present invention.

FIG. 5 illustrates the process by which the present invention accomplishes amplification and refinement of bidirectional optical signals using only a single amplification and refinement stage. Flowchart 500 begins with step 520, where control immediately passes to step 530. In step 530, the present invention monitors, measures and controls input signal power. Monitoring may be through a supervisory channel. A supervisory channel can also monitor physical characteristics of the transmission system, such as pump level for the erbium doped fiber amplifiers. By measuring, monitoring and controlling input amplitudes of individual wavelengths prior to wavelength amplification, the present invention improves the effective dynamic range of the amplifier.

In step 540, the present invention monitors and measures individual wavelength amplitudes after amplification by one gain block, and before passing the wavelength to another gain block. By measuring, monitoring and controlling the individual wavelengths in between gain block stages, the present invention performs mild filtering of selected wavelengths prior to retransmission into the optical fiber.

In step 550, the present invention monitors, measures and controls the amplitudes of individual wavelengths following amplification by the second gain block. By measuring monitoring, and controlling the output amplitudes of individual wavelengths following wavelength amplification, the present invention improves the signal-to-noise ratio of the amplifier. In this manner, the present invention relaxes the requirement for gain flatness. If additional data exists on the input to the amplifier, then control returns to step 520. Otherwise, operation of flowchart 500 is complete, as indicated by step 560.

While the invention has been particularly shown and described with reference to preferred embodiments thereof; it will be understood by those skilled in the art that various changes in form and details may be made therein without departing from the spirit and scope of the invention.

What is claimed is:

1. A multiple wavelength bidirectional lightwave amplifier, comprising:
   a first wavelength division multiplexer coupled to a first optical fiber;
   a second wavelength division multiplexer coupled to a second optical fiber;
   a first and second power management units coupled to said first and second wavelength division multiplexers, respectively;
   a wavelength combiner coupled to said first and second power management units;
   a first optical amplifier coupled to said wavelength combiner;
   a signal conditioner coupled to said first optical amplifier;
   a power equalizer coupled to said signal conditioner;
   a second optical amplifier coupled to said power equalizer;
   a wavelength splitter coupled to said second optical amplifier; and
   a third and fourth power management unit coupled to said wavelength splitter and to said first and second wavelength division multiplexers respectively.

2. The multiple wavelength bidirectional lightwave amplifier of claim 1, wherein said first and second optical fibers each carries a first and second set of optical wavelengths, the first set of optical wavelengths traveling towards said first and second wavelength division multiplexers and the second set of optical wavelengths traveling away from said first and second wavelength division multiplexers.

3. The multiple wavelength bidirectional lightwave amplifier of claim 1, wherein said first and second power management units comprise an acoustic optical tunable filter.

4. The multiple wavelength bidirectional lightwave amplifier of claim 1, wherein said first and second power management units comprise a variable attenuator.

5. The multiple wavelength bidirectional lightwave amplifier of claim 1, wherein said first and second optical amplifiers comprise an erbium doped fiber amplifier.

6. The multiple wavelength bidirectional lightwave amplifier of claim 1, wherein said signal conditioner comprises a dispersion compensator and a wavelength add/drop element.

7. The multiple wavelength bidirectional lightwave amplifier of claim 1, wherein said first, second, third, and fourth wavelength division multiplexers comprise a diffraction grating.

8. A multiple wavelength bidirectional lightwave amplifier, comprising:
   a first wavelength division multiplexer coupled to a first optical fiber;
   a second wavelength division multiplexer coupled to a second optical fiber;
   a first and second power management units coupled to said first and second wavelength division multiplexers, respectively;
   a wavelength combiner coupled to said first and second power management units;
   a first optical amplifier coupled to said wavelength combiner;
   a power equalizer coupled to said first optical amplifier;
   a second optical amplifier coupled to said power equalizer;
   a wavelength splitter coupled to said second optical amplifier; and
   a third and fourth power management unit coupled to said wavelength splitter and to said first and second wavelength division multiplexers respectively.

9. The multiple wavelength bidirectional lightwave amplifier of claim 8, wherein said power equalizer comprises an acoustic optical tunable filter.

10. The multiple wavelength bidirectional lightwave amplifier of claim 8, wherein said power equalizer comprises a variable attenuator.

11. The multiple wavelength bidirectional lightwave amplifier of claim 8, wherein said first and second wavelength division multiplexer comprise a diffraction grating.

12. A multiple wavelength bidirectional lightwave amplifier, comprising:
   a first wavelength division multiplexer coupled to a first optical fiber;
   a second wavelength division multiplexer coupled to a second optical fiber;
   a wavelength combiner coupled to said first and second wavelength division multiplexers;
   a first optical amplifier coupled to said wavelength combiner;
   a second optical amplifier coupled to said first optical amplifier;
   a wavelength splitter coupled to said second optical amplifier; and
   a first and second power management units coupled to said wavelength splitter and to said first and second wavelength division multiplexers, respectively.

13. The multiple wavelength bidirectional lightwave amplifier of claim 12, wherein said power equalizer comprises an acoustic optical tunable filter.

14. The multiple wavelength bidirectional lightwave amplifier of claim 12, wherein said power equalizer comprises a variable attenuator.

15. The multiple wavelength bidirectional lightwave amplifier of claim 12, wherein said first and second optical fibers each carries a first and second set of optical wavelengths, the first set of optical wavelengths traveling towards said first and second wavelength division multiplexers and the second set of optical wavelengths traveling away from said first and second wavelength division multiplexers.

16. A multiple wavelength bidirectional lightwave amplifier, comprising:

a first wavelength division multiplexer coupled to a first optical fiber;

a second wavelength division multiplexer coupled to a second optical fiber;

a first and second power management units coupled to said first and second wavelength division multiplexers, respectively;

a wavelength combiner coupled to said first and second power management units;

a first optical amplifier coupled to said wavelength combiner;

a second optical amplifier coupled to said first optical amplifier;

a wavelength splitter coupled to said second optical amplifier; and a third and fourth power management unit coupled to said wavelength splitter and to said first and second wavelength division multiplexers respectively.

17. A multiple wavelength bidirectional lightwave amplifier, comprising:

a first wavelength division multiplexer coupled to a first optical fiber;

a second wavelength division multiplexer coupled to a second optical fiber;

a first and second power management units coupled to said first and second wavelength division multiplexers, respectively;

a wavelength combiner coupled to said first and second power management units;

a first optical amplifier coupled to said wavelength combiner;

a power equalizer coupled to said first optical amplifier;

a second optical amplifier coupled to said power equalizer; and a wavelength splitter coupled to said second optical amplifier and to said first and second wavelength division multiplexers, respectively.

18. A multiple wavelength bidirectional lightwave amplifier, comprising:

a first wavelength division multiplexer coupled to a first optical fiber;

a second wavelength division multiplexer coupled to a second optical fiber;

a first and second power management units coupled to said first and second wavelength division multiplexers, respectively;

a wavelength combiner coupled to said first and second power management units;

a first optical amplifier coupled to said wavelength combiner;

a second optical amplifier coupled to said first optical amplifier; and a wavelength splitter coupled to said second optical amplifier and to said first and second wavelength division multiplexers, respectively.

19. The multiple wavelength bidirectional lightwave amplifier of claim 18, wherein said first and second optical amplifiers comprise an erbium doped fiber amplifier.

20. The multiple wavelength bidirectional lightwave amplifier of claim 18, wherein said first and second power management units comprise an acoustic optical tunable filter.

* * * * *